United States Patent
Sugama

(10) Patent No.: US 9,245,370 B2
(45) Date of Patent: Jan. 26, 2016

(54) IMAGE DRAWING APPARATUS, COMPUTER-READABLE MEDIUM STORING PROGRAM, AND METHOD OF THE SAME

(71) Applicant: FUJITSU LIMITED, Kawasaki-shi (JP)

(72) Inventor: Yasushi Sugama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 13/683,831

(22) Filed: Nov. 21, 2012

(65) Prior Publication Data

US 2013/0181981 A1 Jul. 18, 2013

(30) Foreign Application Priority Data

Jan. 13, 2012 (JP) .................................. 2012-005516

(51) Int. Cl.
*G06T 15/00* (2011.01)
*G06T 1/60* (2006.01)

(52) U.S. Cl.
CPC .. *G06T 15/00* (2013.01); *G06T 1/60* (2013.01)

(58) Field of Classification Search
CPC ........... G06T 15/005; G06T 1/60; G06T 1/20; G06T 11/203; G06T 2200/28; G06T 11/40; G06T 11/20; G06T 11/00; G06F 12/0875; G06F 9/30036; G06F 12/0862; G06F 8/4442; G09G 5/363; G09G 2360/121; G09G 5/39; G09G 5/393; G09G 5/395; G06K 15/1855
See application file for complete search history.

(56) References Cited

U.S. PATENT DOCUMENTS

| | | |
|---|---|---|
| 5,808,627 A | 9/1998 | Kelley et al. |
| 5,831,634 A | 11/1998 | Wakasu |
| 6,972,769 B1 | 12/2005 | Nebeker et al. |
| 7,472,227 B2 | 12/2008 | McBride et al. |
| 7,583,851 B2 | 9/2009 | Kudo et al. |
| 2008/0256300 A1 | 10/2008 | Lee et al. |
| 2009/0073177 A1* | 3/2009 | Jiao et al. ...................... 345/501 |

FOREIGN PATENT DOCUMENTS

| | | |
|---|---|---|
| JP | 6-67982 | 3/1994 |
| JP | 9-180000 | 7/1997 |
| JP | 10-222695 | 8/1998 |

(Continued)

OTHER PUBLICATIONS

Extended European Search Report dated May 6, 2014 for corresponding European Patent Application 14153123.6 dated May 6, 2014, 5 pages.

(Continued)

*Primary Examiner* — Haixia Du
(74) *Attorney, Agent, or Firm* — Fujitsu Patent Center

(57) ABSTRACT

An image drawing apparatus includes a drawing position judging unit configured to judge a figure drawn on the scan line to be processed and extract each of vertexes constituting the judged figure, an vertex information reading unit configured to read vertex information, an image generating unit configured to generate graphics data of the scan line, and a line buffer configured to store the graphics data, wherein the vertex information reading unit includes a cache memory, a cache tag configured to store an address storing the vertex information when the vertex information is stored in the cache memory, and a control unit configured to refer to the cache tag, and read the vertex information from the address of the cache memory when the address is stored, and store the vertex information in the cache memory and store the address in the cache tag when the address is not stored.

9 Claims, 12 Drawing Sheets

(56) References Cited

FOREIGN PATENT DOCUMENTS

| JP | 11-31236 | 2/1999 |
|----|----------|--------|
| JP | 2000-30081 | 1/2000 |
| JP | 2006-135762 | 5/2006 |
| JP | 2007-48296 | 2/2007 |
| JP | 2009-545825 | 12/2009 |
| JP | 2011-86235 | 4/2011 |
| WO | WO-2008/019261 | 2/2008 |
| WO | 2010/138870 A2 | 12/2010 |

OTHER PUBLICATIONS

Hoppe, Hugues, "Optimization of Mesh Locality for Transparent Vertex Caching," Computer Graphics Proceedings, Annual Conference Series, Proceedings of Siggraph Annual International Conference on Computer Graphics and Interactive Techniques, Jan. 1, 1999, pp. 269-276, XP000981469.

Extended European Search Report dated Apr. 8, 2013 for corresponding European Application No. 12194183.5.

EPO—Office Action of European Patent Application No. 12194183.5 dated Oct. 20, 2014.

JPOA—Japanese Office Action issued for corresponding Japanese Patent Application No. 2012-005516 dated Jul. 14, 2015, with partial English translation.

EPOA—Office Action of European Patent Application No. 12194183.5 dated Nov. 25, 2015.

EPOA—Office Action of European Patent Application No. 14153123.6 dated Nov. 25, 2015.

* cited by examiner

FIG. 6

| VERTEX NUMBER | FINAL USE LINE |
|---|---|
| 0 | Y=16 |
| 1 | Y=11 |
| 2 | Y=19 |
| 3 | Y=19 |
| 4 | Y=16 |
| 5 | Y=19 |
| : | : |

EL

IMAGE DRAWING APPARATUS, COMPUTER-READABLE MEDIUM STORING PROGRAM, AND METHOD OF THE SAME

CROSS-REFERENCE TO RELATED APPLICATION

This application is based upon and claims the benefit of priority of the prior Japanese Patent Application No. 2012-005516, filed on Jan. 13, 2012, the entire contents of which are incorporated herein by reference.

FIELD

The embodiment discussed herein is relates to an image drawing apparatus, computer-readable medium storing an image drawing program, and an image drawing method.

BACKGROUND

An image drawing apparatus that draws a 3D image, and the like generates graphic information on a 2D display surface based on, for example, vertex information of a figure (for example, see Japanese Patent Application Laid-Open Nos. H11-31236, H10-222695, H9-180000, and 2000-30081). Further, the drawing apparatus generates an image displayed on the 2D display surface based on the generated graphic information. For example, the image drawing apparatus includes a frame buffer storing a color of a pixel and a depth buffer storing a depth (Z value) of the pixel.

In a general image drawing apparatus, the frame buffer and the depth buffer need a memory size as many as the number of pixels on the display surface. For example, when the display surface is 800×600 pixels and a data size (a total value of the color and the depth) per one pixel is 8 bytes, the frame buffer and the depth buffer need a memory size of approximately a total of 3.7 MB.

In order to store data as many as the number of pixels on the display surface, the buffers (the frame buffer and the depth buffer) having a large memory size are needed. For example, when the frame buffer having the large memory size, and the like are formed as an SRAM in the drawing apparatus, a circuit dimension and cost are significantly increased. Further, when the frame buffer having the large memory size, and the like are formed as a DRAM outside the drawing apparatus, there is a problem in that power consumption by inputting and outputting data in the external DRAM is increased and cost by mounting the DRAM as another chip is increased.

SUMMARY

According to a first aspect of the embodiment, an image drawing apparatus that draws a figure in a drawing region having a plurality of scan lines, the apparatus includes a drawing position judging unit configured to judge a figure drawn on the scan line to be processed and extract each of vertexes constituting the judged figure, an vertex information reading unit configured to read, with respect to the scan line to be processed, vertex information including coordinate information of the extracted vertex from an vertex information memory storing vertex information of the vertex of the figure drawn in the drawing region, an image generating unit configured to generate graphics data of the scan line to be processed based on the read vertex information; and a line buffer configured to store the graphics data generated by the image generating unit, wherein the vertex information reading unit includes a cache memory configured to temporarily store the vertex information, a cache tag configured to store an address storing the vertex information when the vertex information is stored in the cache memory with respect to all vertexes of the figure drawn in the drawing region; and a control unit configured to refer to the cache tag, and read the vertex information from the address of the cache memory when the address is stored with respect to vertex information to be read, and store the vertex information read from the vertex information memory in the cache memory and store the address in the cache tag when the address is not stored.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating one example of final use line information based on the detailed example of FIG. 5;

DESCRIPTION OF EMBODIMENTS

Hereinafter, embodiments of the present invention will be described with reference to the accompanying drawings. However, a technical scope of the present invention is not limited to the embodiments and is included within matters described in the appended claims and equivalents thereto.

<First Embodiment>

Figure 1:
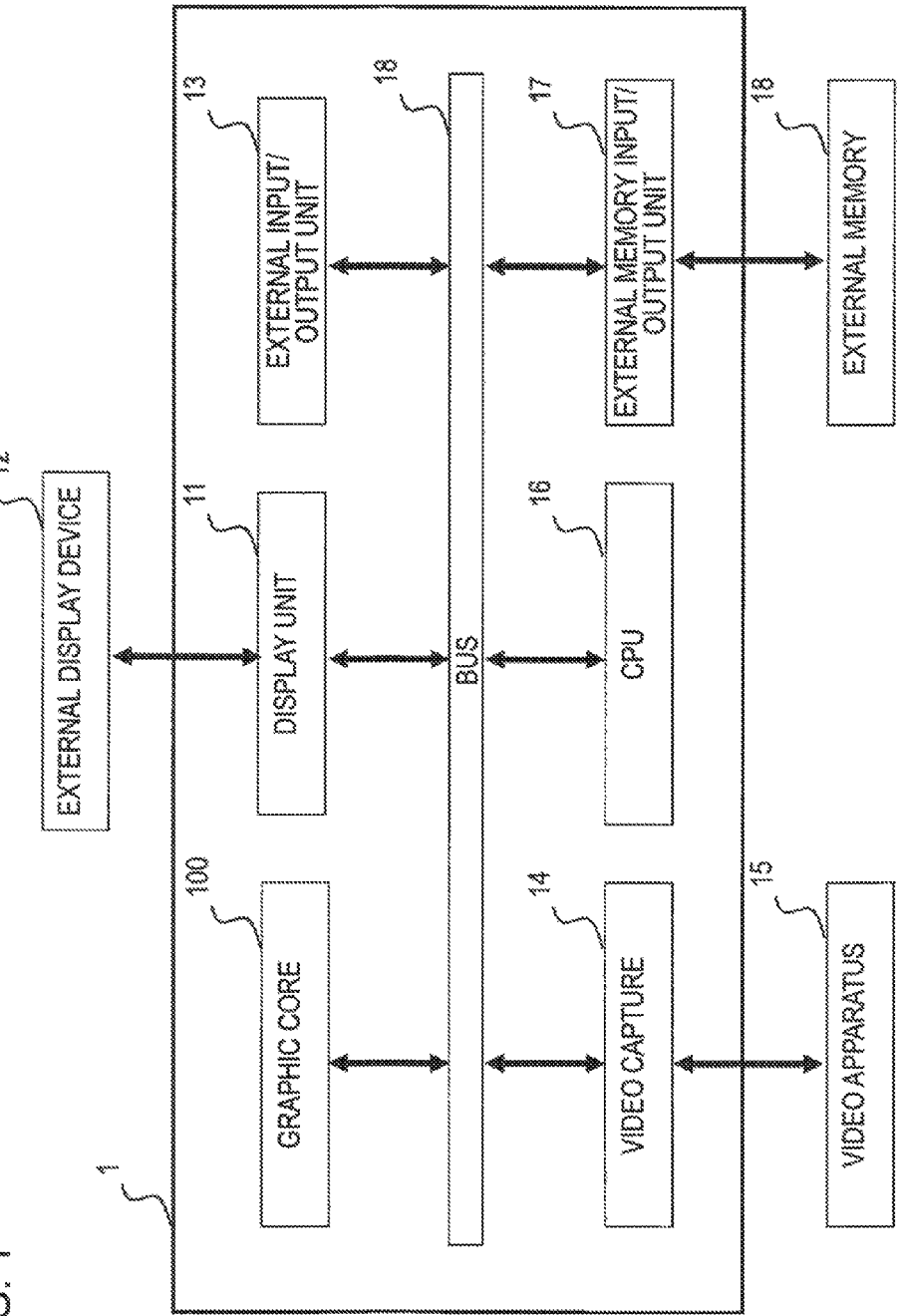
FIG. 1 is an exemplary diagram illustrating a configuration of an image display device in the embodiment.

FIG. 1 is an exemplary diagram illustrating a configuration of an image display device in the embodiment. The image display device in the figure includes a graphic core 100, a display unit 11, an external input/output unit 13, a video capture 14, a CPU 16, and an external memory input/output unit 17 that accesses an external memory 18, which are connected to each other through, for example, a bus 18. The graphic core 100 generates graphics data based on a drawing command and displays the generated graphics data on an external display device 12 through the display unit 11. The graphic core 100 illustrates one example of the image drawing apparatus in the embodiment.

Figure 2:
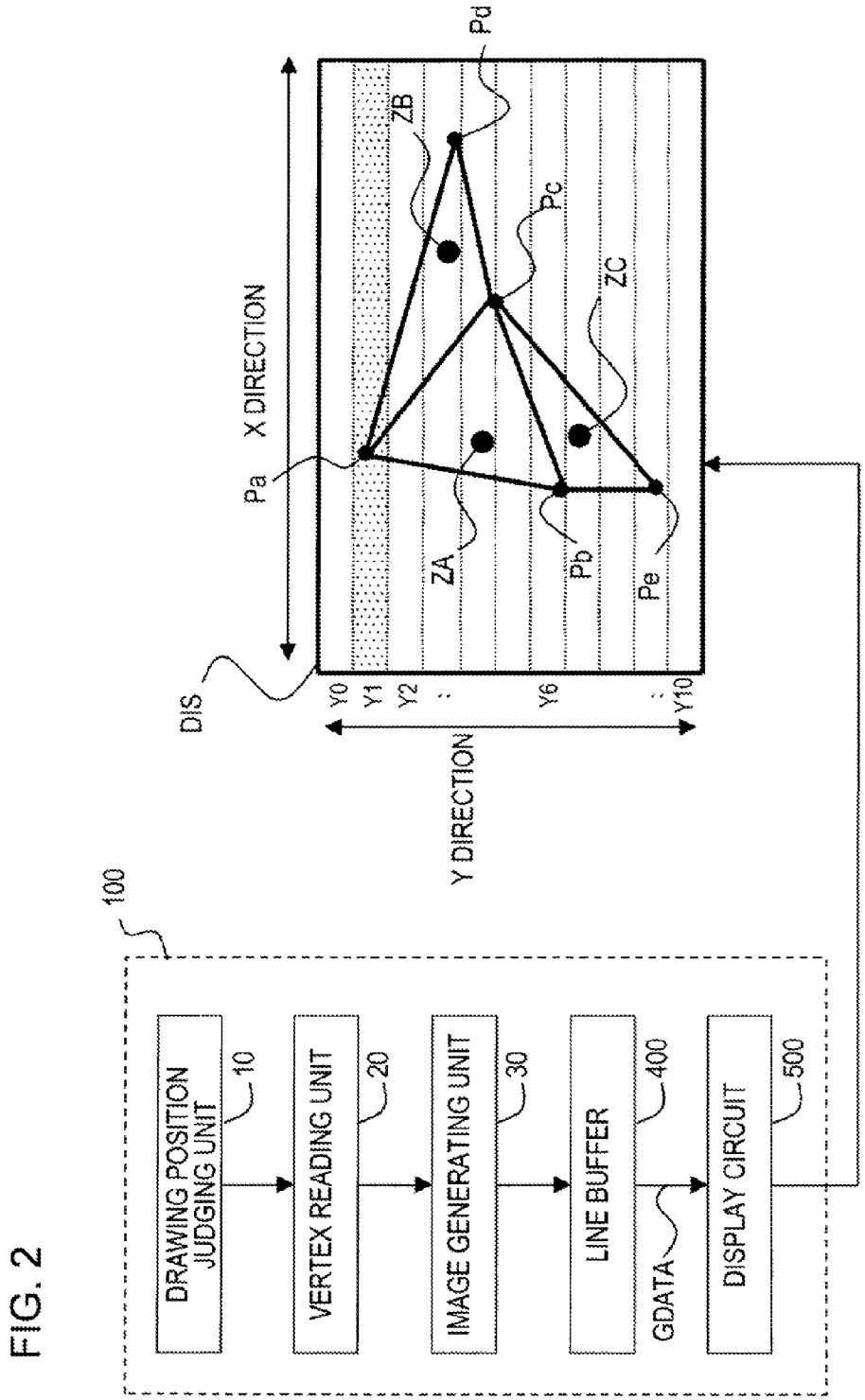
FIG. 2 is a diagram illustrating one example of an image drawing apparatus in the embodiment.

FIG. 2 is a diagram illustrating one example of the image drawing apparatus 100 in the embodiment. The image drawing apparatus 100 displays, for example, a 3D image, and the like on a 2D display surface DIS. Like the 2D display surface DIS at a right figure of the figure, the image drawing apparatus 100 generates, for example, graphics data GDATA for each of scan lines Y0 to Y10 acquired by dividing the 2D display surface DIS in a Y direction. Further, in the figure, each of regions acquired by dividing the 2D display surface DIS into eleven in a Y direction is set as the scan line, but may be regions divided in an X direction or is not limited to the number of divided regions of this example.

In the embodiment, the image drawing apparatus 100 includes, for example, a drawing position judging unit 10, an vertex reading unit 20, an image generating unit 30, a line buffer 400, and a display circuit 500. Herein, an overview of processing of the image drawing apparatus 100 will be simply described. The line buffer 400 stores the graphics data GDATA of the scan line.

The drawing position judging unit 10 receives, for example, a drawing command and vertex information of the figure, judges a drawing position of the figure, which is drawn on the 2D display surface DIS, and extracts an vertex number of each of vertexes constituting the figure drawn on the corresponding scan line with respect to each scan line. In detail, the drawing position judging unit 10 removes figures other than a display region based on the vertex information of each vertex of the figure and calculates a drawing range of a predetermined direction (for example, a Y direction) with respect to a figure to be drawn. For example, the drawing position judging unit 10 calculates a minimum Y coordinate and a maximum Y coordinate among the vertexes of the figure as the Y-direction drawing range. The drawing position judging unit 10 judges a scan line (drawing scan line range) in which the calculated Y-direction drawing range of the figure is included in a Y-coordinate region.

Subsequently, the drawing position judging unit 10 outputs a drawing command (VC) of the figure and the drawing scan line range to a drawing command buffer 210. The drawing position judging unit 10 judges a figure drawn on a target scan line based on each figure and the drawing scan line range which are stored in the drawing command buffer 210 when the scan line is selected, and extracts information on vertexes constituting the corresponding figure.

The vertex number is the number granted by a user or an apparatus, and a unique number to specify the vertex. Further, the vertex number is not limited to the number, but may be vertex identification information, vertex ID, and the like capable of identifying the vertex. In the embodiment, the figure has a triangular shape, but is not limited to a triangle.

For example, on the 2D display surface DIS of FIG. 2, for example, the drawing position judging unit 10 calculates a Y coordinate of an vertex Pa which is the maximum Y coordinate and a Y coordinate of an vertex Pb which is the minimum Y coordinate among the vertexes Pa, Pb, and Pc constituting a figure ZA. The drawing position judging unit 10 judges the scan lines Y1 to Y6 having a Y-coordinate region within a range of the Y coordinate of the vertex Pa and the Y coordinate of the vertex Pb. As a result, it is determined that the figure ZA is drawn on the scan lines Y1 to Y6. Similarly with respect to a figure ZB, the scan lines Y1 to Y4 to be drawn are detected. The drawing scan line ranges of the figures ZA and ZB are output to the command buffer 210 together with a drawing command VC.

When the scan line Y1 is selected, drawing the figures ZA and ZB on the scan line Y1 is detected based on the information stored in the drawing command buffer 210. As a result, the vertex number of each of the vertexes Pa, Pb, and Pc constituting the figure ZA and the vertex number of each of the vertexes Pa, Pc, and Pd constituting the figure ZB are extracted with respect to the scan line Y1. Similarly with respect to other scan lines, the vertex number is extracted by the drawing position judging unit 10.

Subsequently, the vertex reading unit 20 reads vertex information of the extracted vertex number from an vertex information memory (external memory 18) with respect to a scan line to be processed. The vertex information includes, for example, coordinate information and color information of the vertex. In general, the vertex information is stored in the memory such as the external memory 18, and the like as a data amount is large. The image generating unit 30 generates the graphics data GDATA of the figure based on the vertex information read from the external memory, and stores the generated graphics data in the line buffer 400. When graphics data GDATA of all figures drawn on the corresponding scan line are generated with respect to the scan line to be processed, and stored in the line buffer 400, the stored graphics data are displayed by the display circuit 500.

According to an example of the 2D display surface DIS of FIG. 2, for example, the vertex reading unit 20 reads the vertex information of the vertexes Pa, Pb, and Pc of the figure ZA from the external memory and the image generating unit 30 generates the graphics data GDATA of the figure ZA based on the read vertex information and stores the generated graphics data in the line buffer 400 of the scan line Y1. Similarly with respect to the figure ZB, the graphics data GDATA is generated and stored in the line buffer 400. The graphics data of the line buffer 400 of the scan line Y1 is displayed by the display circuit 500.

As such, the image drawing apparatus 100 according to the embodiment extracts the vertex number of the figure drawn on the corresponding scan line every scan lines acquired by dividing the 2D display surface DIS, and generates the graphics data GDATA every scan lines. As a result, in the image drawing apparatus 100 according to the embodiment, the memory size of the line buffer 400 may be decreased up to the same size as a graphics data amount for one scan line. That is, in the image drawing apparatus 100, when the graphics data of the entire 2D display surface DIS is generated and stored in the frame buffer, the memory size of the buffer storing the graphics data GDATA may be decreased.

However, in the image drawing apparatus 100 that generates the graphics data GDATA every scan lines, the graphics data GDATA is generated by not the unit of the figure but the unit of the scan line. As a result, in drawing all scan lines in which a predetermined figure is drawn, the vertex information of the vertexes constituting the corresponding figure is read every time. When the figure is drawn throughout X scan lines, the same vertex information is read from the external memory X times. That is, when the graphics data is generated by the unit of the figure, the number of reading times of the vertex information of each of the vertexes constituting the figure is one, while when the graphics data is generated every scan lines, the number of reading times becomes the number of drawn scan lines.

For example, in an example of FIG. 2, the vertex information of the vertex Pa is read every drawing of the scan lines Y1 to Y6, that is, 6 times in that the figure ZA constituted by the vertex Pa is drawn on the scan lines Y1 to Y6. As such, in the image drawing apparatus 100 that generates the graphics data GDATA every scan lines, the memory size of the buffer storing the graphics data GDATA may be decreased, while the number of reading times of the vertex information stored in the external memory 18 is increases, which is not efficient.

Therefore, the vertex reading unit 20 of the image drawing apparatus 100 according to the embodiment has a cache memory and temporarily stores the vertex information. As a result, while the vertex information to be read is stored in the cache memory, the corresponding vertex information need not be read from the external memory 18, and as a result, the number of access times to the external memory 18 is suppressed and the processing becomes efficient. The cache memory is generally controlled through a cache tag.

The cache tag in the embodiment has an address of the cache memory corresponding to not each address of the cache memory but all the vertexes of the figure to be drawn. That is, the cache tag in the embodiment does not store the vertex number (vertex ID, and the like) of the vertex information stored in the corresponding address to correspond to each address of the cache memory but when the vertex information is stored in the cache memory to correspond to each vertex, stores the address information.

As a result, the vertex reading unit 20 need not judge cache hit/miss by retrieving the vertex number from the cache tag. Address information indicating cache hit/miss with respect to the vertex information to be read is continuously stored in the cache tag in the embodiment. Therefore, the vertex reading unit 20 may efficiently judge cache hit/miss by directly referring to the address information related to the vertex information of the target in the cache tag based on, for example, the vertex number or the vertex ID.

As such, the vertex reading unit 20 need not retrieve the cache tag and may directly refer to the address information related to the vertex information of the target in the cache tag to rapidly judge cache hit/miss. The vertex reading unit 20 may acquire the address information of the cache memory storing the vertex information of the target in the case of cache hit.

In general, the total number of a series of vertexes to be processed in the image drawing apparatus 100 is supposable and even when the cache tag has information to correspond to each vertex, a data capacity may be suppressed within a supposition range. As a result, as in the embodiment, a cache tag using the vertex number corresponding to each vertex as an index may be used. On the other hand, since a cache memory such as a processor, and the like targets at a large amount of information, when each information is set as the index, the data capacity of the cache tag is enlarged. As a result, as in the embodiment, with respect to the cache tag of the cache memory storing the vertex information related to image processing, the vertex number may be set as the index.

Figure 3:
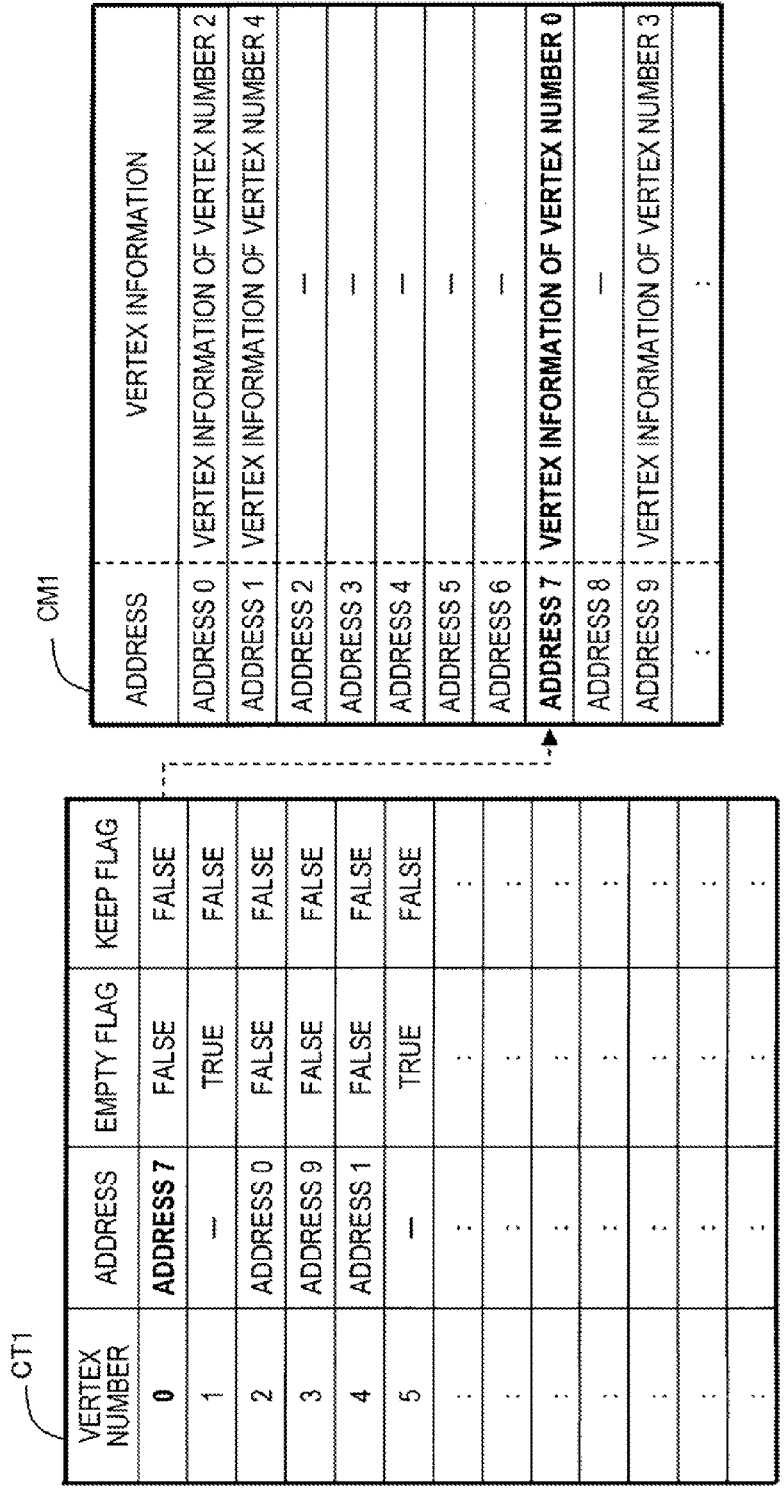
FIG. 3 is a diagram illustrating one example of a cache tag in the embodiment.

FIG. 3 is a diagram illustrating one example of a cache tag CT1 in the embodiment. As illustrated in the figure, the cache tag CT1 has information associated with all the vertexes of the figure drawn on the 2D display surface DIS (reverse cache tag).

In the example of FIG. 3, for example, when the cache tag CT1 is referred to based on the vertex number 0, Address 7 is acquired and cache hit is judged. Vertex information of vertex number 0 is stored in Address 7 of cache memory CM1. Meanwhile, when the cache tag CT1 is referred to based on vertex number 1, a valid address is not stored, and thus cache miss is judged. As such, according to the cache tag CT1 in the embodiment, cache hit/miss is rapidly judged based on the vertex number without the need for retrieving whether the vertex number of the target is present.

Referring back to the processing of FIG. 2, the drawing position judging unit 10 extracts final use line information representing a scan line of which a processing order is late, among the scan lines on which the figure constituted by the corresponding vertexes is drawn, with respect to each vertex, to correspond to the vertex number. For example, in the example of FIG. 2, a final use line of the vertex Pa becomes the scan line Y6 of which the processing order is late among the scan lines Y1 to Y6 on which the figures ZA and ZB constituted by the vertex Pa are drawn. The final use line information is used in controlling the cache memory in the vertex reading unit 20.

In detail, when the final use line of the vertex number of the target coincides with the scan line to be processed at the time of judging the vertex information of the target deleted from the cache memory CM, the vertex reading unit 20 sets the corresponding vertex information as the deletion target. This is caused by the fact that the vertex information of the vertex number of the target is not used in a subsequently processed scan line when the final use line of the vertex number of the target coincides with the scan line to be processed. The vertex information which is not used need not be held on the cache memory CM and thus becomes the deletion target.

As a result, only the vertex information certainly read on the scan line to be processed after a next time is held in the cache memory CM. Therefore, a cache hit rate of the cache memory CM is improved and the number of reading times in the external memory is suppressed.

Subsequently, the processing of each processing unit of the image drawing apparatus 100 describing the overview in FIG. 2 will be described in more detail.

Figure 4:
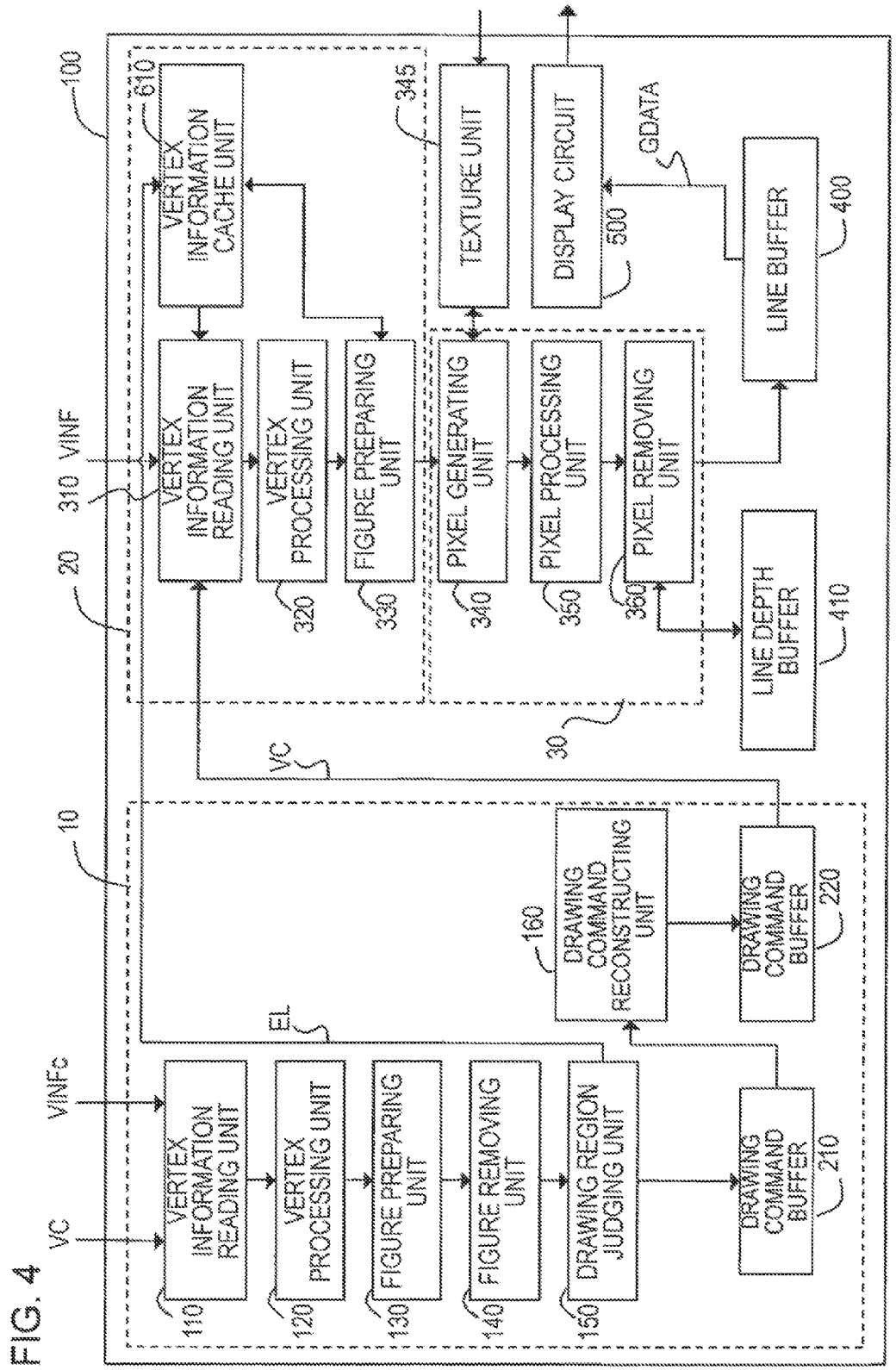
FIG. 4 is a diagram illustrating detailed processing in the image drawing apparatus in the embodiment.

FIG. 4 is a diagram illustrating more detailed processing of the image drawing apparatus 100 in the embodiment. In the figure, the same reference numerals refer to the same processing units as in FIG. 2. The drawing position judging unit 10 performs a part of geometry processing, for example, based on the drawing command VC and vertex information VINF of the figure. The drawing position judging unit 10 includes, for example, a vertex information reading unit 110, an vertex processing unit 120, a figure preparing unit 130, a figure removing unit 140, a drawing region judging unit 150, and a drawing command reconstructing unit 160.

The drawing position judging unit 10, for example, reads coordinate information VINFc of the figure in the vertex information VINF, judges the figure drawn on each scan line of the 2D display surface DIS, and extracts the vertex number of each vertex configuring the figure drawn on each scan line. The vertex information VINF includes, for example, information (hereinafter, referred to as coordinate information) on a 3D coordinate of each vertex of the figure, color information of each vertex, information on a texture coordinate, and information on a normal vector. The coordinate information VINFc may be, for example, information on a 2D coordinate or only coordinate information of the figure.

In detail, the vertex information reading unit 110, for example, reads the coordinate information VINFc from a memory (vertex information memory) storing the vertex information VINF and outputs the read coordinate information VINFc to the vertex processing unit 120. The vertex processing unit 120 performs vertex processing associated with the coordinate, such as rotation, and the like based on the coordinate information VINFc. Continuously, the figure preparing unit 130 converts a result of the vertex processing by the vertex processing unit 120 into information on the figure. In this example, the figure preparing unit 130 receives information on three vertexes (vertexes of a triangle) as a result of the vertex processing with respect to each figure and converts the result of the vertex processing into information on the triangle. As a result, figure information on the figure corresponding to the coordinate information VINFc is generated.

The figure removing unit 140 removes figure information on the figure which is not drawn on the 2D display surface DIS in the figure information generated by the figure preparing unit 130. For example, the figure removing unit 140 performs clipping or curling, and removes superfluous figure information. For example, in the clipping, the figure removing unit 140 removes a figure other than the display region. For example, in the curling, the figure removing unit 140 performs front/back surface judgment of the figure and removes a figure judged as a back surface. In a set-up of displaying the back surface of the figure, the figure removing unit 140 adds front/back surface information such as a flag indicating the back surface of the figure to the figure information.

The figure removing unit 140 outputs the figure information on the figure drawn on the 2D display surface DIS to the drawing region judging unit 150. The figure information includes, for example, the vertex number of the figure, positional information representing the coordinate of the figure on the 2D display surface DIS, and the front/back surface information of the figure.

The drawing region judging unit 150 calculates the Y-direction drawing range of the figure based on the figure information. For example, the drawing region judging unit 150 calculates the minimum Y coordinate and the maximum Y coordinate among the Y coordinates at which the respective vertexes constituting the figure are positioned, as the Y-direction drawing range. The drawing region judging unit 150 judges the scan line in which the corresponding drawing range is included in the Y-coordinate region based on the calculated Y-coordinate drawing range of the figure to judge the scan line on which the figure is drawn. Subsequently, the drawing region judging unit 150 outputs the drawing command VC of the figure and the drawing scan line range to the drawing command buffer 210.

The drawing region judging unit 150 extracts the final use line information EL based on the drawing scan line range with respect to each vertex. In detail, the drawing region judging unit 150 extracts the number indicating a scan line of which the processing order is the last in the drawing scan line range of the figure constituted by the vertexes as the final use line information EL.

Herein, the processing of the drawing region judging unit 150 will be described based on a detailed example.

Figure 5:
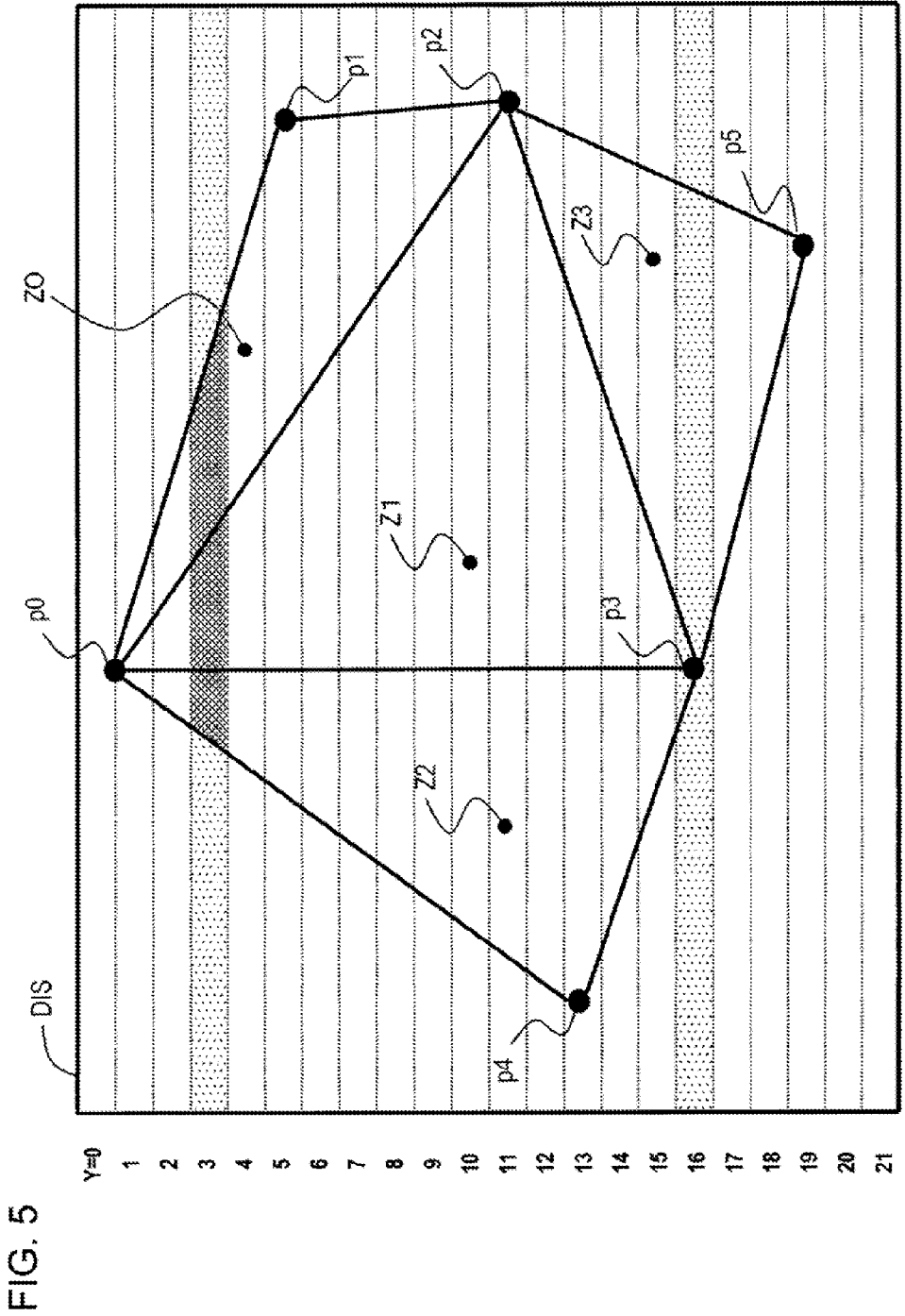
FIG. 5 is a diagram illustrating one example of a detailed example of a figure drawn on a 2D display surface.

FIG. 5 is a diagram illustrating one example of a detailed example of the figure drawn on the 2D display surface DIS. The 2D display surface DIS of the figure is divided into scan lines Y0 to Y21. In this figure, four figures Z0 to Z3 are drawn on the 2D display surface DIS. Vertexes constituting the figure Z0 are vertexes p0, p1, and p2, and vertexes constituting the figure Z1 are vertexes p0, p2, and p3. Similarly, vertexes constituting the figure Z2 are vertexes p0, p3, and p4, and vertexes constituting the figure Z3 are vertexes p2, p3, and p5. In this example, the vertex numbers corresponding to the vertexes p0 to p5 are 0 to 5.

In the example of FIG. 5, the drawing region judging unit 150 calculates the Y-coordinate drawing range of each of the figures Z0 to Z2 constituted by the vertex p0 with respect to the vertex p0. With respect to the figure Z0, the minimum Y coordinate is Y1 and the maximum Y coordinate is Y11 among the Y coordinates Y1, Y5, and Y11 at which the vertexes p0 to p2 constituting the figure Z0 are positioned. Therefore, as the Y-coordinate drawing range of the figure Z0, Y1 to Y11 are calculated. Similarly, Y1 to Y16 as the Y-coordinate drawing range of the figure Z1, Y1 to Y16 as the Y-coordinate drawing range of the figure Z2, and Y11 to Y19 as the Y-coordinate drawing range of the figure Z3 are calculated.

FIG. 6 is a diagram illustrating one example of the final use line information EL based on the detailed example of FIG. 5. As described above, the final use line information EL has the scan line number which is processed last among the scan lines on which the figure constituted by the corresponding vertex is drawn with respect to each vertex. In the embodiment, the processing is performed from the scan line Y0 to the scan line Y21 in sequence.

For example, the vertex number 0 will be described. In the detailed example of FIG. 5, the Y-coordinate drawing ranges of the figures Z0 to Z2 constituted by the vertex p0 of the vertex number 0 are Z0 (Y1 to Y11), Z1 (Y1 to Y16), and Z2 (Y1 to Y16), respectively. Among the scan lines Y1 to Y16 on which the figures Z0 to Z2 are drawn, the scan line Y16 is processed last. Therefore, the final use line of the vertex p0 is Y16. Similarly, the final use line of the vertex p1 of the vertex number 1 is also Y16. Similarly with respect to other vertexes, the final use lines are extracted.

By this configuration, the processing of the drawing region judging unit 150 is performed, and the drawing command VC of the figure, the Y-coordinate drawing range, and the final use line information EL are generated. Continuously, referring back to the description of the processing in FIG. 4, the drawing command reconstructing unit 160 reconstructs the drawing command VC of the figure and the Y-coordinate drawing range which are stored in the drawing command buffer 210 based on the scan line. In detail, the drawing command reconstructing unit 160 reconstructs the drawing command VC of the figure so that the drawing command VC of the figure drawn on the corresponding scan line is placed by the unit of the scan line and stores the reconstructed drawing command VC in a drawing command buffer 220. As a result, information including the drawing command VC of the figure that is drawn on the corresponding scan line is generated with respect to each scan line. Since the drawing command VC of the figure includes the vertex number of each vertex, the vertex number of the figure drawn on the corresponding scan line is extracted by the unit of the scan line.

Figure 7:
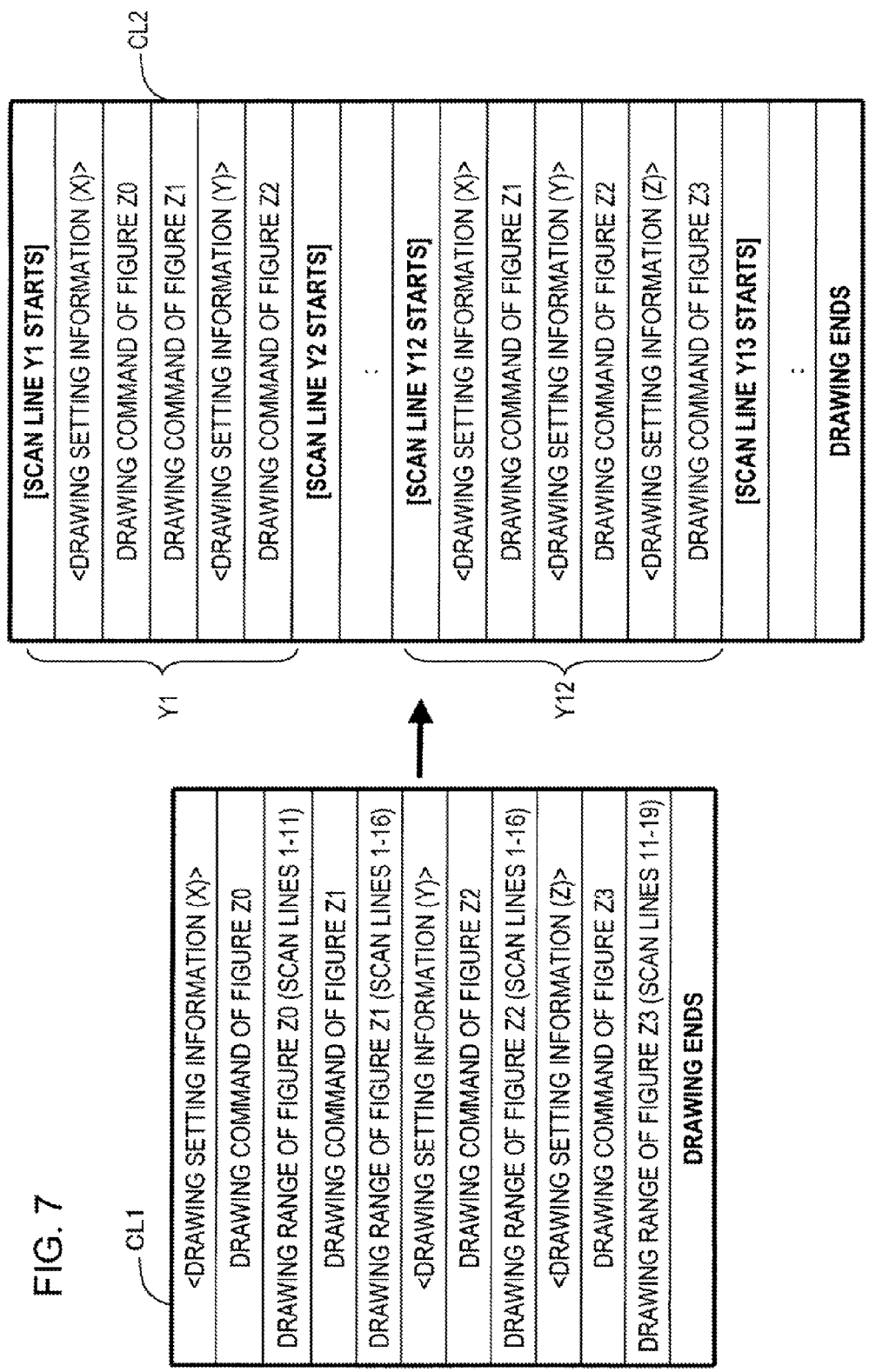
FIG. 7 is an exemplary diagram illustrating a drawing command reconstructed by a drawing command reconstructing unit.

FIG. 7 is an exemplary diagram illustrating drawing command information CL2 reconstructed by the drawing command reconstructing unit 160. In the figure, a left diagram illustrates the drawing command information CL1 before reconstruction and a right diagram illustrates the drawing command information CL2 after reconstruction. In an example of the diagram, drawing setting information is included in the drawing command information in addition to the drawing command VC of the figure. In the drawing command information CL1 before reconstruction in the left diagram, for example, the drawing setting information, the drawing command VC of the figure, and the drawing range are placed according to an input order. On the contrary, in the drawing command information CL2 after reconstruction in the right diagram, the drawing setting information on the corresponding scan lines and the drawing command VC of the figure to be drawn are placed by the unit of the scan line.

In detail, for example, the figures Z0 to Z2 are drawn on the scan line Y1. Therefore, in the drawing command information CL2 after reconstruction in FIG. 7, the drawing setting information X and Y and the drawing commands VC of the figures Z0 to Z2 are placed to correspond to each other with respect to the scan line Y1. As a result, the vertex number of the figure drawn on the scan line Y1 is extracted. Similarly, for example, the figures Z1 to Z3 are drawn on the scan line Y12. Therefore, in the information after reconstruction, the drawing setting information X, Y, and Z and the drawing commands of the figures Z1 to Z3 are placed to correspond to each other, with respect to the scan line Y12. The same is applied to even other scan lines.

As such, the drawing position judging unit 10 judges the drawing range of the figure based on the vertex information VINF at least having the coordinate information and the drawing command VC, and extracts the scan line range in which the figure constituted by the corresponding vertex is drawn with respect to each vertex. As a result, the vertex number (the drawing command VC) of the vertex constituting the figure drawn on the corresponding scan line is extracted every scan lines. The drawing position judging unit 10 extracts the number of the scan line last processed in the scan line range in which the figure constituted by the corresponding vertex is drawn as the final use line information EL with respect to each vertex.

Referring back to the description of the processing in FIG. 4, subsequently, the vertex reading unit 20 reads the vertex information VINF of the vertex number of the corresponding drawing command VC based on the drawing command VC extracted by the drawing position judging unit 10 with respect to the scan line to be processed. The vertex reading unit 20 includes, for example, an vertex information reading unit 310, an vertex information cache unit 610, an vertex processing unit 320, and a figure preparing unit 330.

In detail, the vertex information reading unit 310 acquires the drawing command VC of the figure drawn on the corresponding scan line from the drawing position judging unit 10 with respect to the scan line to be processed. The vertex information reading unit 310 reads the vertex information VINF corresponding to the vertex number of the drawing command VC from the vertex information memory which is the external memory. However, when the vertex information VINF corresponding to the vertex number is stored in the cache memory, the vertex information VINF is read from the cache memory.

Reading (processing in the vertex information cache unit 610) the vertex information VINF from the external memory or the cache memory will be described below in detail with reference to a flowchart. First, the outline of processing in FIG. 4 will be described.

In the embodiment, the vertex information VINF subjected to vertex processing by the vertex processing unit 320 subsequent to the vertex information reading unit 310 is stored in the cache memory. In detail, when the vertex information reading unit 310 reads the vertex information VINF of the target from the external memory, the vertex information reading unit 310 outputs the read vertex information VINF to the vertex processing unit 320 together with an empty address of the cache memory output from the vertex information cache unit 610 to perform the vertex processing. The figure preparing unit 330 stores the vertex information VINF after the vertex processing in the empty address of the cache memory, and converts the vertex information VINF into the figure information and outputs the corresponding figure information to the image generating unit 30.

Meanwhile, when the vertex information VINF of the target is read from the cache memory, the vertex information reading unit 310 outputs the read address of the cache memory output from the vertex information cache unit 610 to the figure preparing unit 330 through the vertex processing unit 320. The figure preparing unit 330 reads the vertex information VINF from the read address of the cache memory, and converts the read vertex information VINF into the figure information and outputs the corresponding figure information to the image generating unit 30.

The vertex processing unit 320 performs the vertex processing based on, in detail, the vertex information VINF. The vertex processing performed by the vertex processing unit 320 includes, for example, the processing associated with the coordinate, such as the rotation, and the like, writing, calculation of the color of each vertex, calculation of the texture coordinate, and calculation of the normal vector of each vertex. The vertex information VINF subjected to the vertex processing is input into the figure preparing unit 330 together with the empty address.

The figure preparing unit 330 writes and reads the vertex information VINF in the cache memory, and converts the vertex information VINF into the vertex information VINF of the figure and outputs the corresponding vertex information VINF to the image generating unit 30. In this example, the figure preparing unit 330 receives information on three vertexes (vertexes of the triangle) as a result of the vertex processing and converts the result of the vertex processing into the figure information of the triangle. The converted vertex information VINF includes, for example, the positional information (the coordinate on the 2D display surface DIS) of the figure, information on an equation of each side of the figure, information on a color, information on the texture coordinate, information on the normal vector, and Z-direction information (information on a depth).

Subsequently, the processing in the image generating unit 30 will be described. The image generating unit 30, for example, performs geometry processing and rendering processing based on the vertex information VINF of each figure acquired from the figure preparing unit 330. The image generating unit 30 includes, for example, a pixel generating unit 340, a pixel processing unit 350, and a pixel removing unit 360.

In detail, the pixel generating unit 340 generates pixel information based on the vertex information VINF of each figure acquired from the figure preparing unit 330. The pixel generating unit 340 outputs the pixel information to the pixel processing unit 350. The pixel processing unit 350 performs the calculation of the color or the calculation of the texture coordinate based on the pixel information received from the pixel generating unit 340 and texture information of a texture unit 345 by the unit of a pixel. For example, the pixel processing unit 350, and the like refer to setting information related to the scan line to be processed at the time of generating the pixel information of the scan line. The setting information includes, for example, a conversion matrix of the figure, material information such as reflectivity, and the like, and positional information of a light source.

The pixel removing unit 360 removes pixel information which is not drawn on the 2D display surface DIS in the pixel information processed by the pixel processing unit 350. A line depth buffer 410 stores, for example, the depth (Z value) of the pixel. The pixel removing unit 360, for example, performs a Z test based on the Z value (the depth of the pixel) stored in the line depth buffer 410, and removes superfluous pixel information. Pixel information which is not removed but left corresponds to the graphics data GDATA of the scan line to be drawn. The pixel removing unit 360 stores the graphics data GDATA of the scan line in the line buffer 400.

By this configuration, the graphics data GDAT of the scan line to be processed is generated and output to the display unit 11 of FIG. 1, and the like through the display circuit 500.

Herein, reading (the processing in the vertex information cache unit 610) the vertex information VINF from the external memory or the cache memory in the vertex information reading unit 310 of FIG. 4 as described above will be described in detail. The vertex information reading unit 310 outputs the vertex number VN to be read and start information SS of the scan line to the vertex information cache unit 610.

Figure 8:
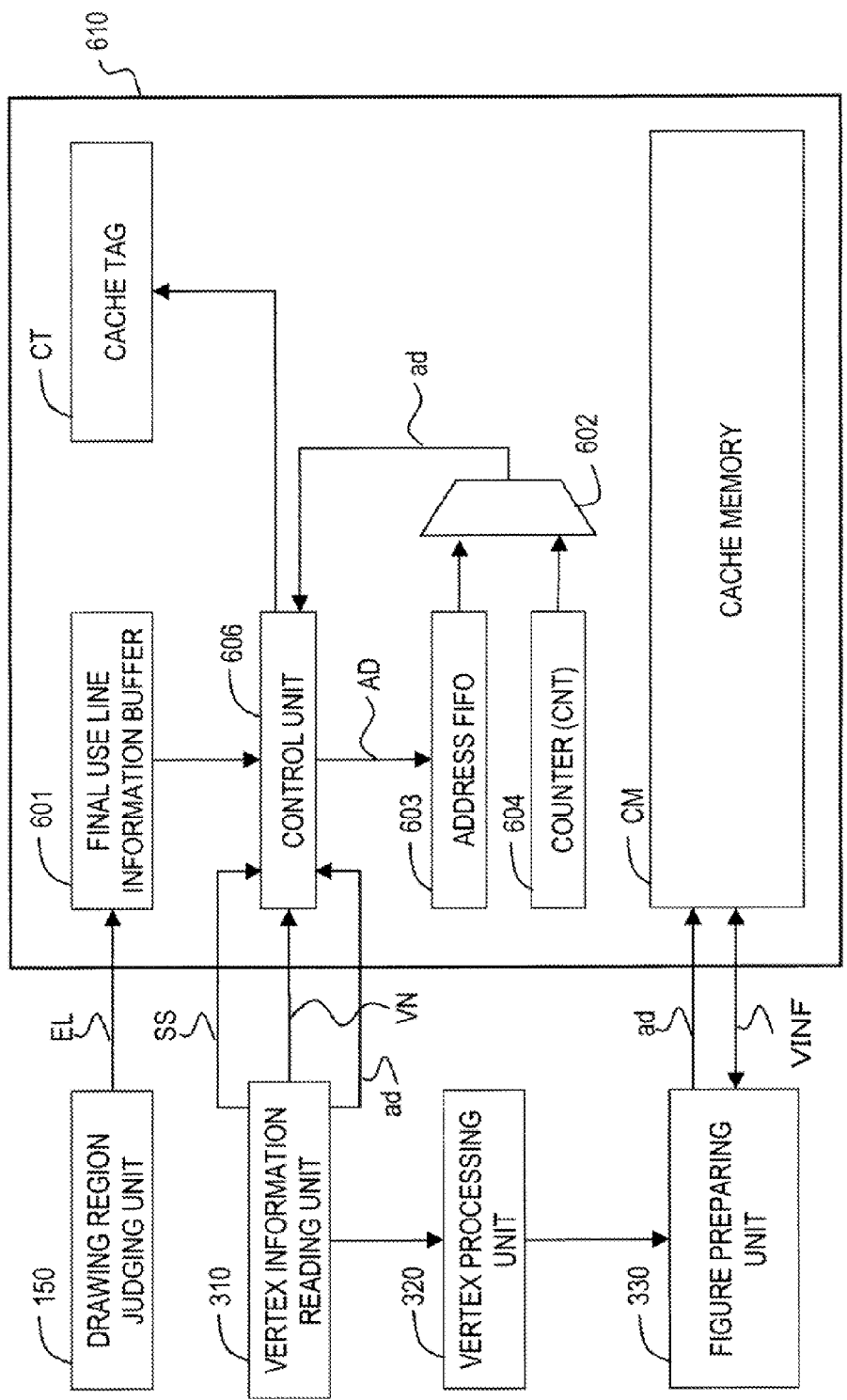
FIG. 8 is an exemplary diagram illustrating a configuration of an vertex information cache unit in the embodiment.

FIG. 8 is an exemplary diagram illustrating a configuration of the vertex information cache unit 610 in the embodiment. The vertex information cache unit 610 includes a control unit 606, a cache tag CT, a cache memory CM, a final use line information buffer 601, an address first in first out (FIFO) 603, a counter 604, and a selector circuit 602.

The control unit 606 of FIG. 8 controls various flags and address information ad in the cache tag CT based on the final use line information EL of the final use line information buffer 601 and the address information ad output from the address FIFO 603 or the counter 604. The control unit 606 acquires the start information SS and the vertex number VN of the scan line to be processed from the vertex information reading unit 310 and outputs a reading address ad and a writing destination address ad of the cache memory CM to the vertex information reading unit 310. The vertex information VINF is input into/output from the cache memory CM based on the reading address ad and the writing address ad which are input from the figure preparing unit 330.

The cache tag CT stores the address information of the cache memory CM, for example, when the vertex information VINF corresponding to the corresponding vertex number is to be stored in the cache memory CM to correspond to the vertex number with respect to all of the vertexes of the figure drawn on the 2D display surface DIS, as described above in FIG. 3. The cache tag CT in the embodiment has an Empty flag and a Keep flag in addition to the address of the cache memory CM as illustrated in FIG. 3. A value of the Empty flag indicates whether the vertex information VINF of the corresponding vertex number is stored in the cache memory CM (when not stored, True) and a value of the Keep flag indicates whether to hold the vertex information VINF in the cache memory CM when the vertex information VINF is stored in the cache memory CM (when hold, True).

The final use line information EL extracted by the drawing region judging unit 150 (see FIG. 4) is stored in the final use line information buffer 601. The final use line information EL with respect to the vertex constituting the figure drawn on the scan line to be processed may be held or the final use line information EL with respect to all of the vertexes may be held, in the final use line information buffer 601.

After the number of the vertex information VINF stored in the cache memory CM reaches N, the empty address of the cache memory CM is held in the address FIFO 603 as a list. In detail, when the superfluous vertex information VINF is deleted from the cache memory CM, a deletion address ad is added to the address FIFO 603 by the control unit 606. When new vertex information VINF is written in the cache memory CM, the addresses are sequentially output from the firstly added address ad of the address FIFO 603, to the selector circuit 602 as the writing address ad.

The counter 604 counts the number of the vertex information VINF stored in the cache memory CM and outputs a count value to the selector circuit 602 as the writing address ad while the number of the vertex information VINF stored in the cache memory CM reaches N. The selector circuit 602 selects the address ad output from the counter 604 while the number of the vertex information VINF stored in the cache memory CM reaches N and the address ad output from the address FIFO 603 after the number reaches N, and outputs the addresses to the control unit 606.

Subsequently, a flow of the processing in the vertex information cache unit 610 of FIG. 8 will be described based on the flowchart.

Figure 9:
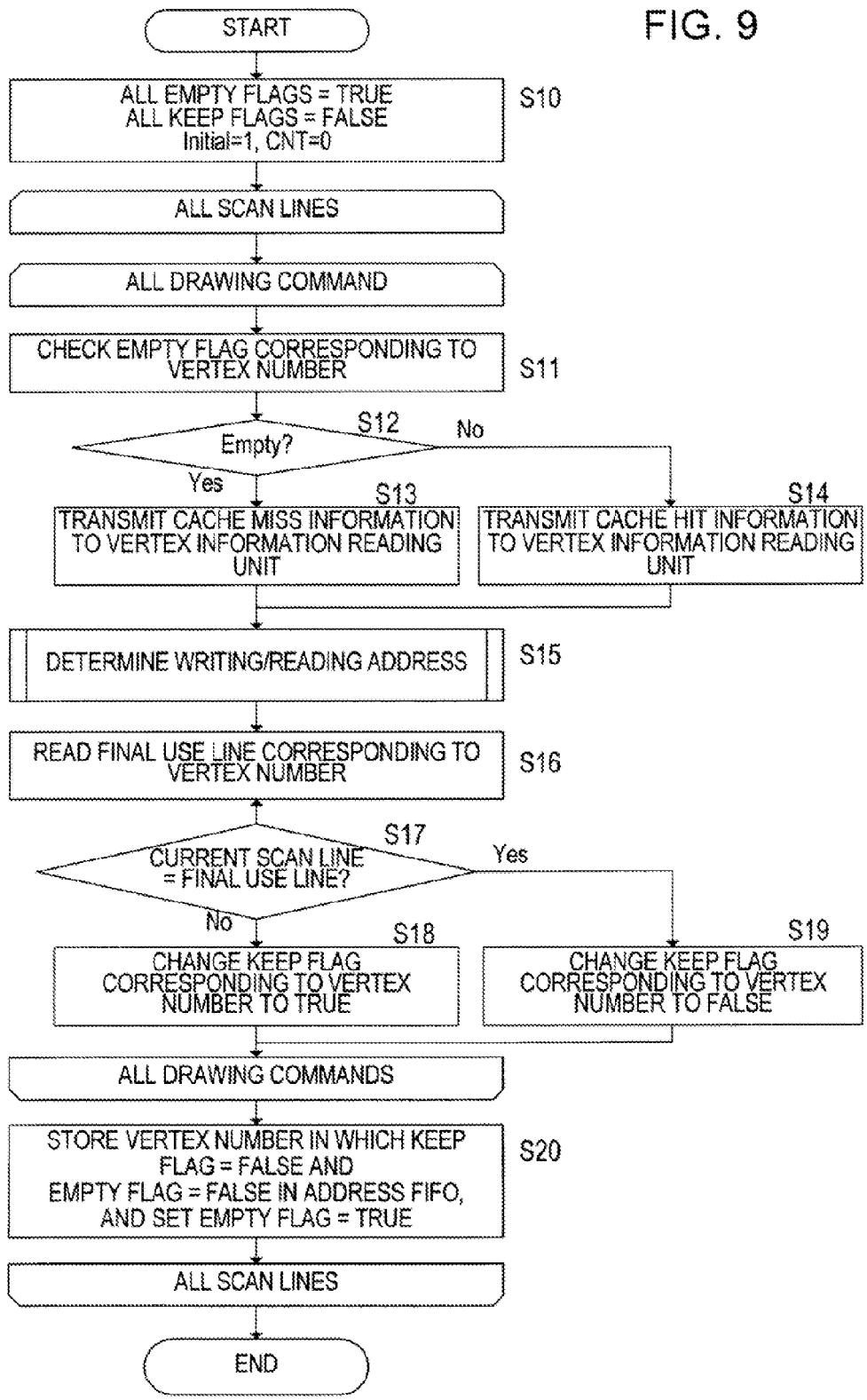
FIG. 9 is a flowchart describing processing in the vertex information cache unit of FIG. 8.

FIG. 9 is a flowchart describing the processing in the vertex information cache unit 610 of FIG. 8. In this processing, the vertex information cache unit 610 has an initial flag Initial (corresponding to the selector circuit 602 of FIG. 8, 1 indicates that the counter 604 is selected and 0 indicates that the address FIFO 603 is selected) and a counter CNT (corresponding to the counter 604 of FIG. 8). An initial value of the initial flag Initial is 1 indicating that the number of the vertex information VINF stored in the cache memory does not reach N and an initial value of the counter CNT is 0 indicating that the cache memory is empty (S10). Processing of processes S11 to S20 is performed with respect to all of the scan lines.

The control unit 606 of the vertex information cache unit 610 acquires the vertex number based on the drawing command of the figure drawn on the scan line to be processed. The control unit 606 refers to the cache tag CT based on the vertex number and checks the Empty flag corresponding to the vertex number of the target (S11).

When the Empty flag is False (NO in S12), cache hit is judged in order to represent that the vertex information VINF of the target is stored in the cache memory CM. As a result, the control unit 606 transmits cache hit information to the vertex information reading unit 310 (S14). Meanwhile, when the Empty flag is True (YES in S12), cache miss is judged in order to represent that the vertex information VINF of the target is not stored in the cache memory CM. As a result, the control unit 606 transmits cache miss information to the vertex information reading unit 310 (S13).

Subsequently, the control unit 606 determines the reading address ad of the vertex information VINF from the cache memory CM in the case of cache hit and the writing address ad of the vertex information VINF in the cache memory CM in the case of cache miss (S15). Herein, process S15 will be described in detail based on the following flowchart.

Figure 10:
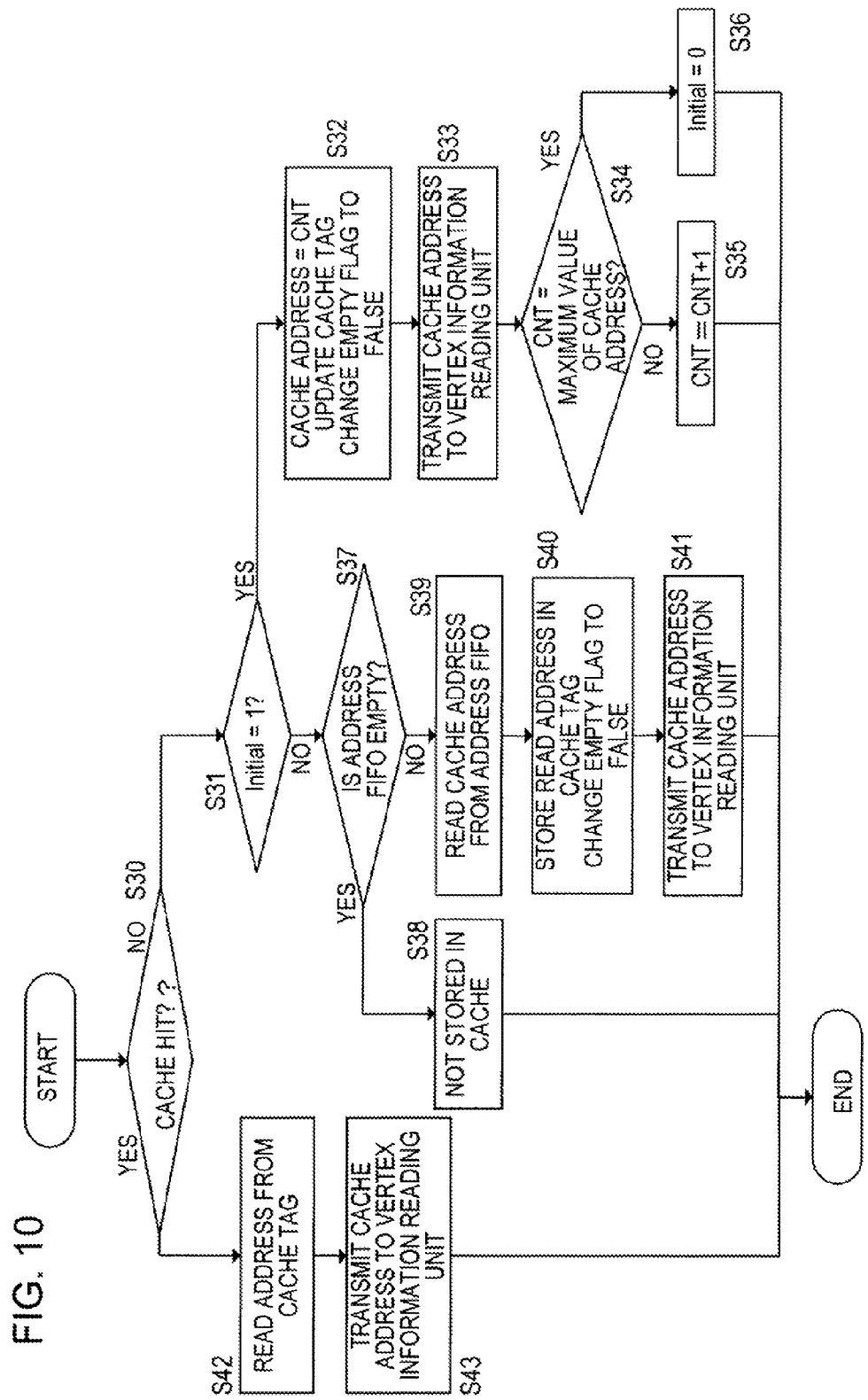
FIG. 10 is a flowchart describing details of address determining (S15) in the flowchart of FIG. 9.

FIG. 10 is a flowchart describing details of the address determining (S15) in the flowchart of FIG. 9.

First, the case of cache hit will be described. In the case of cache hit (YES in S30), the control unit 606 reads the address information ad stored in the cache tag CT to correspond to the vertex number (S42) and outputs the read address information ad to the vertex information reading unit 310 together with the cache hit information (S43).

Subsequently, the case of the cache miss information will be described. In the case of cache miss (NO in S30), the control unit 606 transfers an empty address to the vertex information reading unit 310 together with the cache miss information when the empty address of the cache memory CM is present (S31 to S41).

In detail, the control unit 606 first judges whether the initial flag Initial is 1 (S31). The case where the initial flag Initial is 1 (YES in S31) represents that the number of the vertex information stored in the cache memory CM has not yet reached N. In this example, until the number of the vertex information VINF stored in the cache memory CM reaches N, the vertex information VINF is stored in the address ad represented by the value of the counter CNT.

Therefore, the control unit 606 stores the value (ad) of the counter CNT as the address of the vertex number of the target with respect to the cache tag CT and changes the Empty flag from True to False (S32). Continuously, the control unit 606 outputs the corresponding address ad to the vertex information reading unit 310 together with the cache miss information (S33).

Subsequently, the control unit 606 judges whether the value of the counter CNT coincides with a maximum value of the address of the cache memory CM (S34). The case where the value of the counter CNT coincides with the maximum value (YES in S34) represents that the number of the vertex information VINF stored in the cache memory CM reaches N. Therefore, the control unit 606 changes the initial flag Initial to 0 (S36), and in subsequent processing, the control unit 606 controls the empty address to be acquired based on not the counter CNT but the address FIFO. Meanwhile, the case where the value of the counter CNT does not coincide with the maximum value of the address of the cache memory CM (NO in S34) represents that the number of the vertex information VINF stored in the cache memory CM has not yet reached N. As a result, the control unit 606 does not change the value of the initial flag Initial but counts up the value of the counter CNT (S35).

Referring back to process S31, when the initial flag Initial is 0 (NO in S31) and the number of the vertex information VINF stored in the cache memory CM reaches N, the control unit 606 acquires the empty address from the address FIFO 603. In detail, the control unit 606 judges whether the address is stored in the address FIFO 603 (S37). The case where the address FIFO 603 is empty (YES in S37) represents that the cache memory CM is not empty. In this case, the control unit 606 does not store the vertex information VINF in the cache memory CM (S38). As a result, the control unit 606 outputs only the cache miss information to the vertex information reading unit 310.

Meanwhile, when the address FIFO 603 holds the address (NO in S37), the control unit 606 acquires the address acquired from the address FIFO 603 as the empty address ad of the cache memory CM (S39). As such, the empty address is held in the address FIFO 603, and as a result, the control unit 606 need not retrieve the cache memory CM and the cache tag CT in order to acquire the empty address of the cache memory CM. The control unit 606 may acquire the empty address of the cache memory CM only by reading the address from the address FIFO 603. Therefore, the empty address of the cache memory CM is rapidly acquired and the throughput of the entire processing is improved.

Subsequently, the control unit 606 stores the address ad acquired from the address FIFO 603 as the address information of the vertex number of the target with respect to the cache tag CT and changes the Empty flag from True to False (S40). The control unit 606 outputs the corresponding address ad to the vertex information reading unit 310 together with the cache miss information (S41).

As such, the control unit 606 outputs the reading address ad of the cache memory CM to the vertex information reading unit 310 together with the cache hit information in the case of cache hit. As described above in FIG. 4, the vertex information VINF is read from the reading address ad of the cache memory CM by the figure preparing unit 330.

Meanwhile, the control unit 606 outputs the writing address ad in the cache memory CM to the vertex information reading unit 310 when the cache memory CM is empty together with the cache miss information in the case of cache miss. As described above in FIG. 4, the vertex information VINF is read from the external memory and the vertex information VINF subjected to the vertex processing is stored in the writing address ad of the cache memory CM by the figure preparing unit 303.

Subsequently, the processing of the flowchart in FIG. 9 will be described based on the detailed example of FIG. 5.

Figure 11:
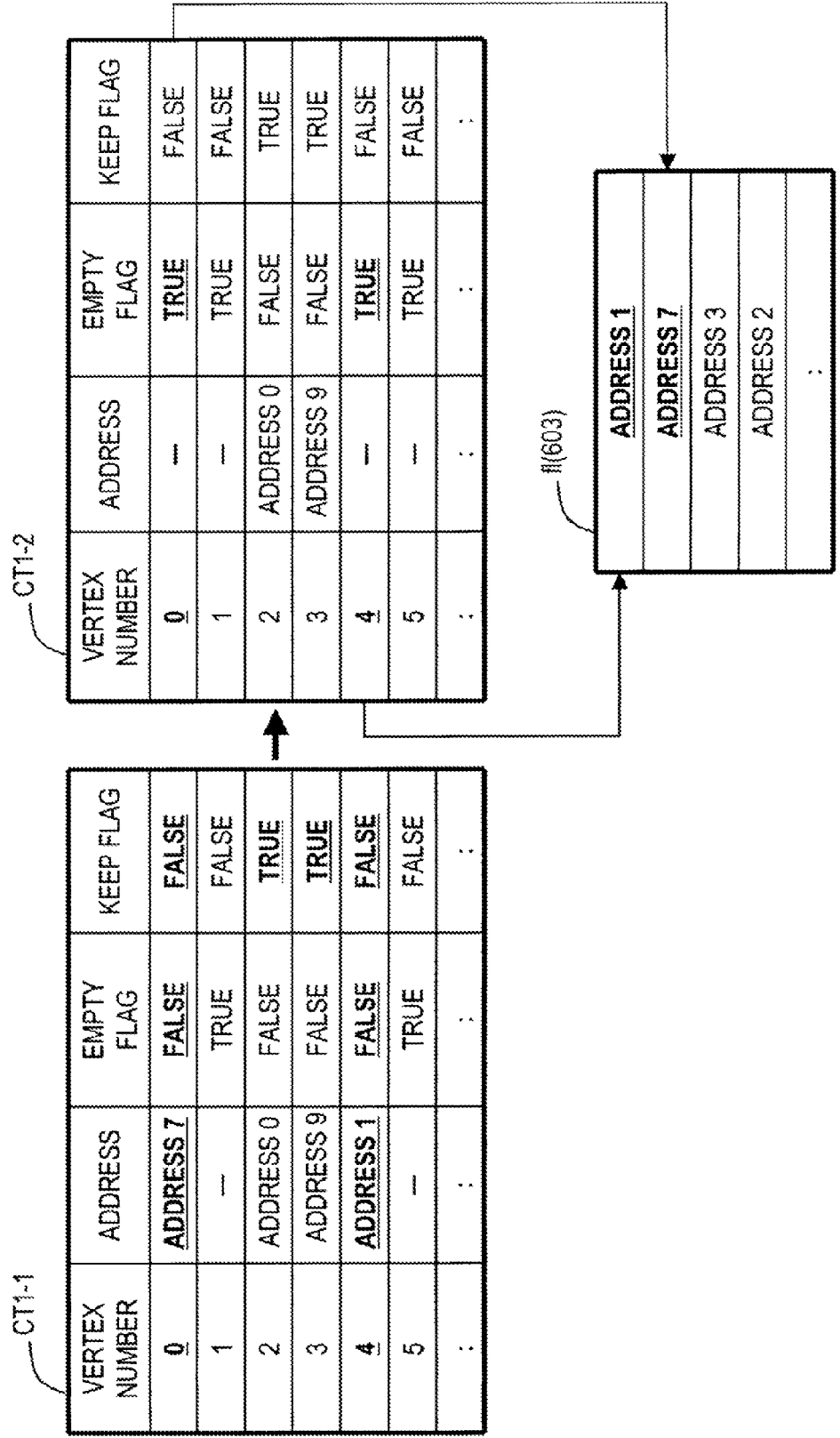
FIG. 11 is a diagram illustrating one example of transition of a cache tag in a first embodiment.

FIG. 11 is a diagram illustrating one example of transition of cache tags CT1-1 and CT1-2 based on the detailed example of FIG. 5. In the diagram, the vertex information VINF of the vertex numbers 0, and 2 to 4 is stored in the cache memory CM and the address of the cache memory CM storing the vertex information VINF is stored in the cache tag CT1-1 to correspond to the vertex number. False is designated in the Empty flags having the vertex numbers 0, and 2 to 4, where the vertex information VINF is stored in the cache memory CM and True is designated in Empty flags having the vertex numbers 1 and 5 where the vertex information VINF is not stored in the cache memory CM.

In FIG. 11, for example, when the vertex information VINF having the vertex number 0 is read, the control unit 606 refers to the Empty flag having the vertex number 0 by referring to the cache tag CT1-1 (S12 in FIG. 9). In this case, since the Empty flag having the vertex number 0 is False, cache hit is judged (NO in S12 of FIG. 9), Address 7 to be read is read from the cache tag CT (S42 of FIG. 10), and the address is transmitted to the vertex information reading unit 310 together with the cache hit information (S14 of FIG. 9) (S43 of FIG. 10). The vertex information VINF is read from Address 7 of the cache memory by the figure preparing unit 330.

Meanwhile, when the vertex information VINF having the vertex number 1 is read, the Empty flag having the vertex number 1 in the cache tag CT1-1 is True, and thus cache miss is judged (YES in S12 of FIG. 9). As a result, the vertex information cache unit 610 reads the value of the counter CNT when the initial flag Initial is 1 (YES in S31 of FIG. 10) (S32 and S33 of FIG. 10) and the address firstly stored in the address FIFO 603 when the address is present in the address FIFO 603 (NO in S37 of FIG. 10) in the case where the initial flag Initial is 0 (NO in S31 of FIG. 10) as the writing address in the cache memory CM (S39 of FIG. 10). The address is transmitted to the vertex information reading unit 310 together with the cache miss information (S13 of FIG. 9) (S33 and S41 of FIG. 10). In this case, when the address FIFO 603 is empty (YES in S37 of FIG. 10), only the cache miss information is output.

As such, in the embodiment, the address of each vertex is stored in the cache tag CT1-1 when the vertex information VINF is stored in the cache memory CM. As a result, the vertex information reading unit 310 may judge cache hit/miss rapidly by reversing the address based on the vertex number without retrieving the vertex number VINF from the cache tag CT1-1, and may rapidly acquire the reading address in the cache memory CM in the case of cache hit.

Herein, referring back to the flowchart of FIG. 9, subsequently, deleting the vertex information VINF which becomes superfluous in the cache memory CM (S16 to S20 of FIG. 9) will be described. When the writing address in the cache memory CM or reading address is determined (S15), the control unit 606 of the vertex information cache unit 610 subsequently reads the final use line of the vertex number of the target from the final use line information buffer 601 (S16) and judges whether the scan line to be processed coincides with the final use line (S17).

The case where the corresponding scan line coincides with the final use line (YES in S17) represents that the scan line to be processed is a final scan line in which the vertex information VINF of the vertex number of the target is used. Therefore, the control unit 606 changes the Keep flag corresponding to the corresponding vertex number to False indicating that the vertex information is not held, in the cache tag CT (S19). Meanwhile, the case where the corresponding scan line does not coincide with the final use line (NO in S17) represents that the vertex information VINF of the vertex number of the target is used in a scan line processed later among the scan lines to be processed. Therefore, the control unit 606 changes the Keep flag corresponding to the vertex number of the target in the cache tag CT to True indicating that the vertex information is held (S18).

When processes S11 to S19 are performed with respect of the drawing commands of all the figures drawn on the scan line to be processed, the control unit 606 subsequently deletes superfluous vertex information VINF from the cache memory CM (S20). In detail, the control unit 606 refers to the cache tag CT, and detects the vertex number in which the Keep flag is False (not held) and the Empty flag is False (the vertex information is stored in the cache memory). That is, the vertex information VINF which is stored in the cache memory CM and is not used in the scan line to be processed subsequently is detected as the vertex information VINF to be deleted.

The control unit 606 changes the Empty flag of the vertex number in which the vertex information VINF is deleted from False to True, in the cache tag CT, and adds the deletion address in the cache memory CM to the address FIFO 603. Since the control unit 606 in the embodiment judges cache hit/miss based on the value of the Empty flag of the cache tag CT, the vertex information VINF of the cache memory CM and the address in the cache tag CT need not be deleted, in deleting the vertex information VINF.

As described above, based on the flowcharts of FIGS. 9 and 10, the vertex information VINF of the vertex constituting the figure drawn on the corresponding scan line is read with respect to the scan line to be processed. The processing is performed with respect to all the scan lines.

The processing in processes S16 to S20 of FIG. 9 will be described in detail based on FIG. 11 described above. In the example of FIG. 11, the final use line information buffer 601 is FIG. 6 described above and a case in which the scan line to be processed is Y16 is exemplified based on the detailed example of FIG. 5. In FIG. 5, the figures Z1 to Z3 are drawn on the scan line Y16 and the vertexes to be read are vertexes p0, and p2 to p5.

According to the final use line information EL of FIG. 6, the final use line of the vertexes p0 and p4 among the vertexes p0, and p2 to p5 is Y16 which is the same as the scan line to be processed (YES in S17 of FIG. 9). Therefore, when the control unit 606 reads the vertex information with respect to the vertex numbers 0 and 4 in the cache tag CT1-1 of FIG. 11, the control unit 606 controls the corresponding Keep flag as False indicating that the vertex information need not be held (S19). The control unit 606 controls the corresponding Keep flag as True indicating that the vertex information need to be held, in the cache tag CT1-1 with respect to the vertex numbers 2 and 3 in which the final use line indicates a scan line processed after the scan line to be processed (S18).

When all of the vertex information VINF of the vertex related to the scan line Y16 is read, the control unit 606 controls the Empty flag as False in the cache tag CT1-2 of FIG. 11 and the Empty flag as True with respect to the vertex numbers 0 and 4 in which the Keep flag is False (S20). The control unit 606 adds Addresses 1 and 7 of the cache memory CM storing the vertex information VINF of the vertex numbers 0 and 4 to the address FIFO fl (603 of FIG. 8). In this example, Addresses 2 and 3 are stored in advance in the address FIFO fl.

As such, the control unit 606 detects the vertex information VINF which need not be held in the cache memory CM based on the final use line information EL. The Keep flag is provided in the cache tag CT to correspond to the vertex number, the Keep flag of the vertex number is controlled, in which the final use line coincides with the scan line to be processed, and as a result, the control unit 606 may efficiently detect the vertex information VINF to be deleted only by referring to the Keep flag.

The control unit 606 performs a control to perform pseudo rewrite of the vertex information VINF in the cache memory CM by controlling the Empty flag in the cache tag CT. As a result, for example, even when a time is taken to delete the vertex information VINF from the cache memory CM, the control unit 606 may perform a rapid rewritable control. For example, the Empty flag in the cache tag CT is configured by a more rapidly rewritable memory than an address unit. As a result, the control unit 606 may perform the control more rapidly.

As such, the control unit 606 may detect the vertex information VINF which need not be held certainly and rapidly based on the final use line information EL and rapidly control the vertex information VINF to be deleted in the cache memory CM. As a result, a series of control processing of the vertex information VINF in the cache memory CM is performed rapidly.

As described above, the image drawing apparatus 100 in the embodiment generates the graphics data GDATA every scan lines and stores the generated graphics data in the line buffer 400. As a result, the line buffer 400 storing the graphics data GDATA is just ensured as large as the size for one scan line among the scan lines acquired by dividing the 2D display surface DIS. Therefore, in the embodiment, the memory size of the line buffer 400 becomes smaller than that of the frame buffer storing data (graphics data) of all pixels of the 2D display surface DIS.

The cache tag CT in the embodiment has the address of the cache memory CM to correspond to each vertex (reverse cache tag). As a result, the image drawing apparatus 100 need not retrieve the information on the vertex of the target from the cache tag CT, may judge cache hit/miss rapidly by directly referring to the address information of the vertex in the cache tag CT and acquire the address of the cache memory CM in the case of cache hit. As a result, the image drawing apparatus 100 may rapidly acquire the address to be read, of the cache memory CM in the case of cache hit.

The image drawing apparatus 100 in the embodiment extracts information on the scan line processed later, among the scan lines on which the figure constituted by the corresponding vertex is drawn, as the final use line information, with respect to each vertex. The image drawing apparatus 100 detects the vertex information VINF of the vertex in which the final use line indicates the scan line to be processed as the vertex information VINF to be deleted from the cache memory CM. As a result, the image drawing apparatus 100 certainly sets as the deletion target the vertex information VINF which need not be held in the cache memory CM based on the final use line information, and may control the corresponding vertex information to be rewritable on the cache memory CM. As a result, since only the vertex information VINF used on the scan line to be processed subsequently is held in the cache memory CM, a cache hit rate of the cache memory CM is improved and the number of reading times to the external memory is suppressed.

In the image drawing apparatus 100 in the embodiment, the Keep flag is provided in the cache tag CT, and the Keep flag of the vertex number corresponding to the vertex information VINF to be deleted is controlled by the value indicating that the vertex information is not held. As a result, the image drawing apparatus 100 may detect all of the vertex information VINF to be deleted only by referring to the value of the Keep flag of each vertex at the time of detecting the vertex information VINF to be deleted.

In the image drawing apparatus 100 in the embodiment, the Empty flag is provided in the cache tag CT. As a result, the image drawing apparatus 100 may easily judge cache hit/miss by checking the Empty flag of the vertex of the target in the cache tag CT. Therefore, the control to enable rewriting the vertex information VINF in the cache memory CM is implemented by controlling the Empty flag. As a result, even when the time is taken to delete the vertex information VINF from the cache memory CM and delete the address information from the cache tag CT, the control to rewrite the vertex information VINF may be rapidly and efficiently performed.

The image drawing apparatus 100 in the embodiment includes the address FIFO 603 storing the empty address of the cache memory CM. As a result, the image drawing apparatus 100 may efficiently acquire the empty address of the cache memory CM without retrieving the cache memory CM and the cache tag CT. Therefore, the empty address of the cache memory CM is acquired rapidly.

In this example, the cache tag CT has the Keep flag, and the image drawing apparatus 100 detects the vertex information VINF to be deleted by controlling the Keep flag. However, the Keep flag is not particularly needed. The image drawing apparatus 100 may compare the final use line and the scan line to be processed with respect to each vertex at which the vertex information VINF is read at the time of detecting the vertex information VINF to be deleted without using the Keep flag, and judge whether the corresponding vertex information is to be deleted.

<Second Embodiment>

The first embodiment exemplifies that, when the cache tag (reverse cache tag) having the information associated with each vertex is used, the superfluous vertex information VINF is deleted from the cache memory CM based on the final use line information. However, the deletion method in the cache memory CM is valid even with respect to a case of using the cache tag having the vertex number stored in the corresponding address to correspond to each address of the cache memory CM. The components other than the cache tag CT in the embodiment are the same as those of the first embodiment.

Figure 12:
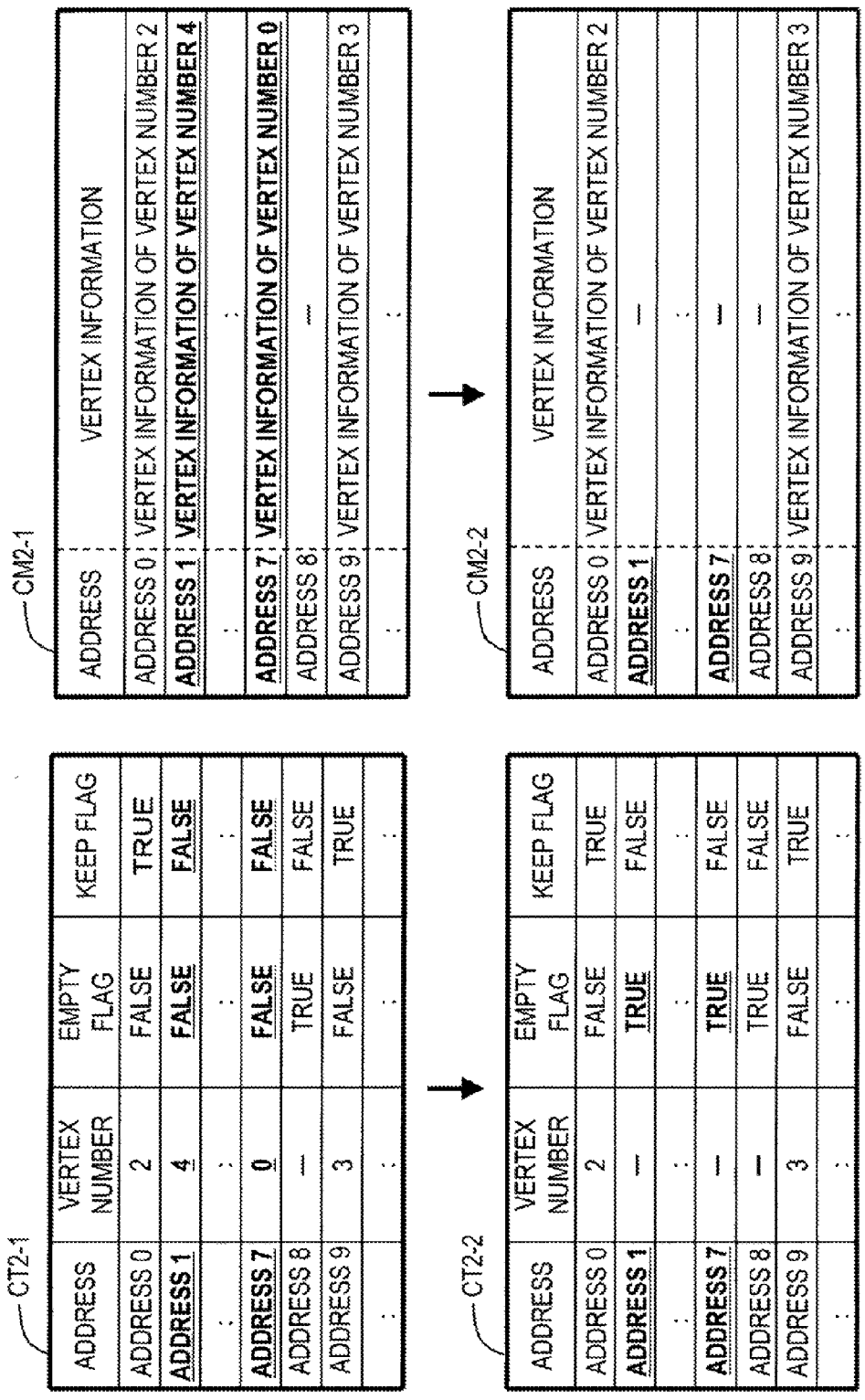
FIG. 12 is a diagram illustrating one example of states of a cache tag and a cache memory in a second embodiment.

FIG. 12 is a diagram illustrating one example of states of cache tags CT2-1 and CT2-2 and cache memories CM2-1 and CM2-2 in the second embodiment. The cache tag CT2-1 in this diagram has an vertex number thereof when the vertex information VINF is stored in the corresponding address to correspond to each address of the cache memory CM2-1 in this diagram. For example, according to the cache tag CT2-1, the vertex information VINF having the vertex number 2 is stored in Address 0 of the cache memory CM2-1.

Subsequently, deleting (S16 to S20 of FIG. 9) the superfluous vertex information VINF in the cache memory CM, which is described in the flowchart of FIG. 9 will be described based on a detailed example of FIG. 12. In this example, similarly as the first embodiment, based on the detailed example of FIG. 5, the scan line to be processed is Y16 and the final use line information EL is FIG. 6.

In the detailed example of FIG. 5, in the processing of the scan line Y16, the vertex information of the vertex numbers 0, and 2 to 4 is read. The final use line corresponding to each vertex number is read (S16). Since the final use line of the vertex numbers 0 and 4 is Y 16, and coincides with the scan line to be processed (YES in S17), the corresponding Keep flag is controlled as False (YES in S17 and S19 of FIG. 9). The Keep flag of the vertex numbers 1 and 3 is controlled as True (NO in S17, and S18).

When all of the vertex information VINF of the vertex related to the scan line Y16 to be processed is read, the control unit 606 controls the Empty flag of the vertex numbers 0 and 4, in which the Empty flag is False and the Keep flag is False, as True, as in CT2-2 of FIG. 12 (S20). As a result, the vertex information VINF of the vertex numbers 0 and 4 is subjected to pseudo deletion from the cache memory CM2-2.

As such, even in the embodiment, only the vertex information VINF used on the scan line to be processed subsequently is held in the cache memory CM2-2 based on the final use line information EL. As a result, the cache hit rate of the cache memory CM2-2 is improved and the number of reading times in the external memory is suppressed. As such, a method of detecting the vertex information VINF to be deleted from the cache memory CM based on the final use line information EL is valid even with respect to any type of cache tag CT.

Even in the embodiment, the Keep flag is not particularly needed. The image drawing apparatus 100 may compare the final use line information EL and the scan line to be processed with respect to each vertex at which the vertex information VINF is read at the time of detecting the vertex information VINF to be deleted without using the Keep flag, and judge whether the corresponding vertex information is to be deleted.

The image drawing in the embodiment may be stored in a computer readable recording medium as a program and a computer reads and executes the corresponding program to perform the image drawing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image drawing apparatus that draws a figure in a drawing region having a plurality of scan lines, the figure being constituted by a plurality of vertexes, each vertex being assigned a unique vertex number, the apparatus comprising:

a drawing position judging unit configured to judge the figure located on a scan line to be processed based on coordinate information of the plurality of vertexes of the figure and coordinate information of the scan line, output drawing command including the vertex numbers of each vertex of the plurality of vertexes of the judged figure, and extract, with respect to the vertex, final use line information indicating the scan line, a processing order of which is lower among the scan lines on which the figure constituted by the corresponding vertex is drawn;

a vertex reading unit configured to read, with respect to the scan line to be processed, vertex information including coordinate information and information relating to color of the vertex, of each of the vertex numbers included in the drawing command, from a vertex information memory storing vertex information of the vertexes of the figure drawn in the drawing region;

a renderer configured to calculate color information per pixel of the scan line to be processed based on the read vertex information, remove color information which is not drawn in the drawing region, and generate graphics data having color information per pixel; and a line buffer configured to store the graphics data generated by the renderer, wherein the vertex reading unit includes a vertex information cache memory:

the vertex information cache memory includes:

a cache memory configured to temporarily store the vertex information which is part of the vertex information of the vertexes of the figure drawn in the drawing region;

a cache tag memory configured to store an address of the cache memory in association with the vertex number when the vertex information is stored in the cache memory and store an empty flag indicating that the vertex information is not stored in association with the vertex number when the vertex information is not stored in the cache memory with respect to all vertex numbers of vertexes of the figure drawn in the drawing region; and a controller configured to refer to the cache tag memory based on the vertex number, and read the vertex information stored in the address of the cache memory when the address is stored in the cache tag memory with respect to the vertex information to be read, store the vertex information read by accessing the vertex information memory in the cache memory and store the address in the cache tag memory in association with the vertex number when the empty flag indicates that the vertex information is not stored, and enable rewriting the vertex information in which the final use line information indicates the scan line to be processed, in the cache memory.

2. The image drawing apparatus of claim 1, wherein the cache tag memory further stores a Keep flag in addition to the address, and the controller controls the Keep flag of the vertex information in which the final use line information indicates the scan line to be processed with a value indicating non-holding and enables rewriting the vertex information in which the value of the Keep flag indicates non-holding.

3. The image drawing apparatus of claim 1, wherein the cache tag memory further stores an invalid flag with respect to all the vertexes of the figure drawn in the drawing region, and the controller enables rewriting the vertex information by controlling the invalid flag with a value indicating invalidity.

4. The image drawing apparatus of claim 3, wherein the invalid flag and the address in the cache tag memory are stored in different storing units and the storing unit storing the invalid flag exhibits a higher access speed than the storing unit storing the address.

5. The image drawing apparatus of claim 1, wherein the controller adds the address of the cache memory storing the vertex information to an empty address list when the vertex information is enabled to be rewritten and acquires the address from the corresponding empty address list when the read vertex information is stored in the cache memory.

6. The image drawing apparatus of claim 1, further comprising:

a display circuit configured to display the graphics data generated in the line buffer.

7. An image drawing apparatus that draws a figure in a drawing region having a plurality of scan lines, the figure being constituted by a plurality of vertexes, each vertex being assigned a unique vertex number, the apparatus comprising:

a drawing position judging unit configured to judge the figure located on a scan line to be processed based on coordinate information of the plurality of vertexes of the figure and coordinate information of the scan line, and extract the vertex numbers of each vertex of the plurality of vertexes of the judged figure and extract final use line information indicating the scan line, a processing order of which is lower among the scan lines on which the figure constituted by the corresponding vertex is drawn;

a vertex reading unit configured to read, with respect to the scan line to be processed, vertex information including coordinate information and information relating to color of the vertex, of each of the extracted vertex numbers, from a vertex information memory storing vertex information of the vertexes of the figure drawn in the drawing region;

a renderer configured to generate graphics data of the scan line to be processed based on the read vertex information, the graphics data having color information per pixel; and a line buffer configured to store the graphics data generated by the renderer, wherein the vertex reading unit includes a vertex information cache memory:

the vertex information cache memory includes;

a cache memory configured to temporarily store the vertex information, and a controller configured to store the vertex information read from the vertex information memory in the cache memory, read the vertex information stored in the cache memory, and enable rewriting the vertex information when the read vertex information coincides with the final use line information.

8. An image drawing method that draws a figure in a drawing region having a plurality of scan lines, the method comprising:

a drawing position judging process of judging the figure drawn on a scan line to be processed, extracting each of vertexes constituting the judged figure, and extracting, with respect to the vertex, final use line information indicating the scan line, a processing order of which is lower among the scan lines on which the figure constituted by the corresponding vertex is drawn;

a vertex reading process of reading, with respect to the scan line to be processed, vertex information including coordinate information of the extracted vertex from a vertex information memory storing vertex information of the vertexes of the figure drawn in the drawing region, and an image generating process of generating graphics data of the scan line to be processed based on the read vertex information and storing the generated graphics data in a line buffer, wherein the vertex reading process includes a control process of referring to a cache tag storing an address of the cache memory when the vertex information is stored in the cache memory and storing an empty flag indicating that the vertex information is not stored when the vertex information is not stored in the cache memory with respect to all vertexes of the figure drawn in the drawing region, with this cache tag being a cache tag for a cache memory temporarily storing the vertex information which is part of the vertex information of the vertexes of the figure drawn in the drawing region, reading the vertex information stored in the address of the cache memory when the address is stored in the cache tag with respect to the vertex information to be read, storing the vertex information read by accessing the vertex information memory in the cache memory and storing the address in the cache tag when the empty flag indicates that the vertex information is not stored, and enabling rewriting the vertex information in which the final use line information indicates the scan line to be processed, in the cache memory.

9. An image drawing method that draws a figure in a drawing region having a plurality of scan lines, the method comprising:

a drawing position judging process of judging the figure drawn on a scan line to be processed, and extracting each of vertexes constituting the judged figure and extracting final use line information indicating the scan line, a processing order of which is lower among the scan lines on which the figure constituted by the corresponding vertex is drawn, a vertex reading process of reading, with respect to the scan line to be processed, vertex information including coordinate information of the extracted vertex from a vertex information memory storing vertex information of the vertexes of the figure drawn in the drawing region, and an image generating process of generating graphics data of the scan line to be processed based on the read vertex information and storing the generated graphics data in a line buffer, wherein the vertex reading process includes a control process of storing the vertex information read from the vertex information memory in the cache memory temporarily storing the vertex information, reading the vertex information stored in the cache memory, and enabling rewriting the vertex information when the read vertex information coincides with the final use line information.

* * * * *